United States Patent [19]

Williams

[11] 4,347,625
[45] Aug. 31, 1982

[54] ARRANGEMENT FOR CELLULAR OPERATION OF A REPEATER TRUNKING SYSTEM

[75] Inventor: James W. Williams, Lynchburg, Va.

[73] Assignee: General Electric Company, Lynchburg, Va.

[21] Appl. No.: 159,650

[22] Filed: Jun. 16, 1980

[51] Int. Cl.³ .................... H04B 7/14; H04B 1/44; H04B 1/00
[52] U.S. Cl. .................................. 455/17; 455/33; 455/54; 455/32; 455/78; 179/2 EB
[58] Field of Search ............. 455/8, 9, 17, 32–34, 455/54, 62, 77, 78, 56; 370/24, 32; 179/2 EB, 2 E

[56] References Cited

U.S. PATENT DOCUMENTS

| | | |
|---|---|---|
| 3,173,966 | 3/1965 | Rypinski . |
| 3,376,509 | 4/1968 | Wilcox et al. . |
| 3,535,636 | 10/1970 | Muilwijk ............................ 455/32 |
| 3,539,924 | 11/1970 | Daskalakis ......................... 455/54 |
| 3,555,424 | 1/1971 | Malm . |
| 3,582,787 | 6/1971 | Muller ................................ 455/33 |
| 3,707,679 | 10/1972 | Bruley et al. . |
| 3,808,537 | 4/1974 | Sarati et al. . |
| 3,913,017 | 10/1975 | Imaseki ............................. 455/33 |
| 4,009,442 | 2/1977 | Bromssen . |
| 4,013,958 | 3/1977 | Spayth . |
| 4,125,808 | 11/1978 | Graham . |
| 4,129,749 | 12/1978 | Goldman . |
| 4,281,413 | 7/1981 | Forrest ............................... 455/34 |

FOREIGN PATENT DOCUMENTS

| | | |
|---|---|---|
| 850698 | 10/1960 | United Kingdom . |
| 1297071 | 11/1962 | United Kingdom . |
| 1145899 | 3/1969 | United Kingdom . |
| 1175130 | 12/1969 | United Kingdom . |
| 1185789 | 3/1970 | United Kingdom . |
| 1276941 | 6/1972 | United Kingdom . |

Primary Examiner—Jin F. Ng
Attorney, Agent, or Firm—Cushman, Darby & Cushman

[57] ABSTRACT

An arrangement for the cellular operation of a repeater trunking system. In a repeater trunking system including a plurality of mobile stations communicating over a predetermined number of communication channels, each associated with a repeater, an arrangement for inhibiting attempted communication on channels not in a selected cell even though the mobile stations are capable of operation on the channels of non-selected cells.

26 Claims, 6 Drawing Figures

ARRANGEMENT FOR CELLULAR OPERATION OF A REPEATER TRUNKING SYSTEM

BACKGROUND OF THE INVENTION

This invention relates generally to repeater trunking systems wherein a plurality of mobile or portable radio stations communicate with one another over several communication channels through repeaters operating one each on each of such channels.

This application is related to and an improvement over the system described in commonly assigned co-pending U.S. patent application Ser. No. 129,645 filed Mar. 12, 1980.

A radio repeater system for a particular geographic locality such as a system used by police, fire, utilities, etc. generally includes multiple repeaters, each operating on one of a plurality of channels assigned for use by that particular repeater trunking system. For example, a repeater trunking system for a local utility company may be assigned channels 1-5. When a mobile user wishes to communicate with one or more other mobile users in a predetermined group, he places his mobile station in a call originate mode, causing it to scan the locally assigned repeater channels to locate a clear channel. Once he finds a clear channel, channel 3, for example, he transmits a signal known as "busy" signal to the repeater operating on that channel. The repeater, upon detecting this busy signal, transmits an acquisition signal having different characteristics from those of the busy signal. This acquisition signal is detected by the mobile user. After this positive "handshake" of signals between a call originating mobile station and a repeater, the repeater and its associated channel become dedicated to the use of the call originating mobile station until it has finished its communication.

Mobile stations utilizing crystals or synthesizers are generally capable of operation on many more channels, i.e., channels 1-25, than are assigned to a particular repeater trunking system in a particular geographic locality. Therefore, before being placed in service, mobile radios are customized for use in a particular service in a particular locality, i.e., their synthesizers are programmed to scan only the channels assigned to a specific repeater trunking system operating in the geographic locality within which it is located. If the mobile station is crystal controlled, they are supplied with crystals allowing operation only on the assigned channels.

It is desirable that mobile users tied to a local repeater trunking system be able to interface with a repeater trunking system operating in a neighboring community. However, using a mobile station that has been customized to operate on five local channels, 1-5, for example, it would be impossible for a mobile user to drive to a different locality and to interface with a repeater trunking system established by a corresponding service, such as a local utility or the local police department in a neighboring community operating on channels 10-15, without reprogramming his mobile radio or substituting appropriate crystals. Such reprogramming is much too complex to be carried out effectively in the field.

One approach to the problem of interfacing with neighboring repeater trunking systems is to dedicate a channel common to all systems. However, this approach requires the use of a computer-based channel transfer arrangement for communications occurring on the common dedicated channel.

In order to allow a direct interface between a mobile user and a neighboring repeater trunking system, it is necessary for his mobile station to be able to operate on the channels of the neighboring system as well as on the channels of his own. However, if each mobile station were equipped to operate on, for example, 25 different channels, so as to be able to interface with neighboring repeater trunking systems, considerable time would be wasted in scanning locally unused channels each time a call were originated.

SUMMARY OF THE INVENTION

In order to provide sufficient flexibility so that a mobile user can drive to a location outside of his normal operating region and interface with the repeater trunking system of a corresponding service such as police or fire in that foreign locality, the present arrangement provides a means for allowing a mobile user to selectively operate his mobile station in one of many cells, each cell including the channels assigned to a specific repeater trunking system.

For example, cell #1 may include channels 1-5, cell #2 may include channels 6-10, etc., where channels 1-5 (cell #1) are assigned to the user's local repeater trunking system and channels 6-10 (cell #2) are assigned to a repeater trunking system in a neighboring community. A mobile user can manually select which cell his mobile station is to operate in. Such selection could, as an alternative, be made automatically response to a signal received from the local repeater trunking system. When a given cell is selected, only the channels associated with that cell are scanned. No time is wasted in scanning channels not utilized in a particular locality. Yet, the user has the flexibility to change cells upon arrival at a neighboring community. Transmissions are allowed only on the channels of the selected cell, thereby saving considerable time and trouble in establishing communication on a clear channel.

Thus, there is provided an arrangement for the cellular operation of a repeater trunking system. The arrangement allows a mobile station normally operating within a first repeater trunking system to interface with a second repeater trunking system operating on a different group of channels than that of the first repeater trunking system without the need for having a dedicated channel and a complex computer-based control system to effect cell selection.

Each mobile station is equipped with the capability for operating on the channels of at least one other repeater trunking system in addition to the channels of its own repeater trunking system (i.e., synthesizer programmed or crystals supplied). The arrangement provides operator controlled means for selecting the cell (group of channels) in which he desires to operate. Selection of a particular cell inhibits the scan of channels not belonging to the selected cell.

Generally, when a mobile user wishes to make a call, he places his mobile station in a call originate mode. A search generator provides coded signals specifying a predetermined channel scan sequence. These coded signals are coupled either to a frequency synthesizer in the case of a synthesizer controlled station or to a crystal select circuit in the case of a crystal controlled station.

A decoder is coupled to the output of the search generator. The decoder decodes the coded signal from the search generator and provides a signal on one of a plurality of selected channel lines, one such selected channel line being associated with each channel that the station is capable of operating on, regardless of the cell in which that channel is located.

A cell select circuit coupled to the selected channel lines from the decoder provides an inhibit signal for channels belonging to a non-selected cell. The inhibt signal is coupled to control circuitry of the mobile stations so as to inhibit the initiation of an attempted exchange of signals between the mobile station and repeater when the station is in a call originate mode.

BRIEF DESCRIPTION OF THE DRAWINGS

Many of the attendant advantages of the present invention will be readily apparent as the invention becomes better understood by reference to the following detailed description with the appended claims when considered in conjunction with the accompanying drawings wherein:

DETAILED DESCRIPTION OF THE PREFERRED EMBODIMENT

Figure 1:
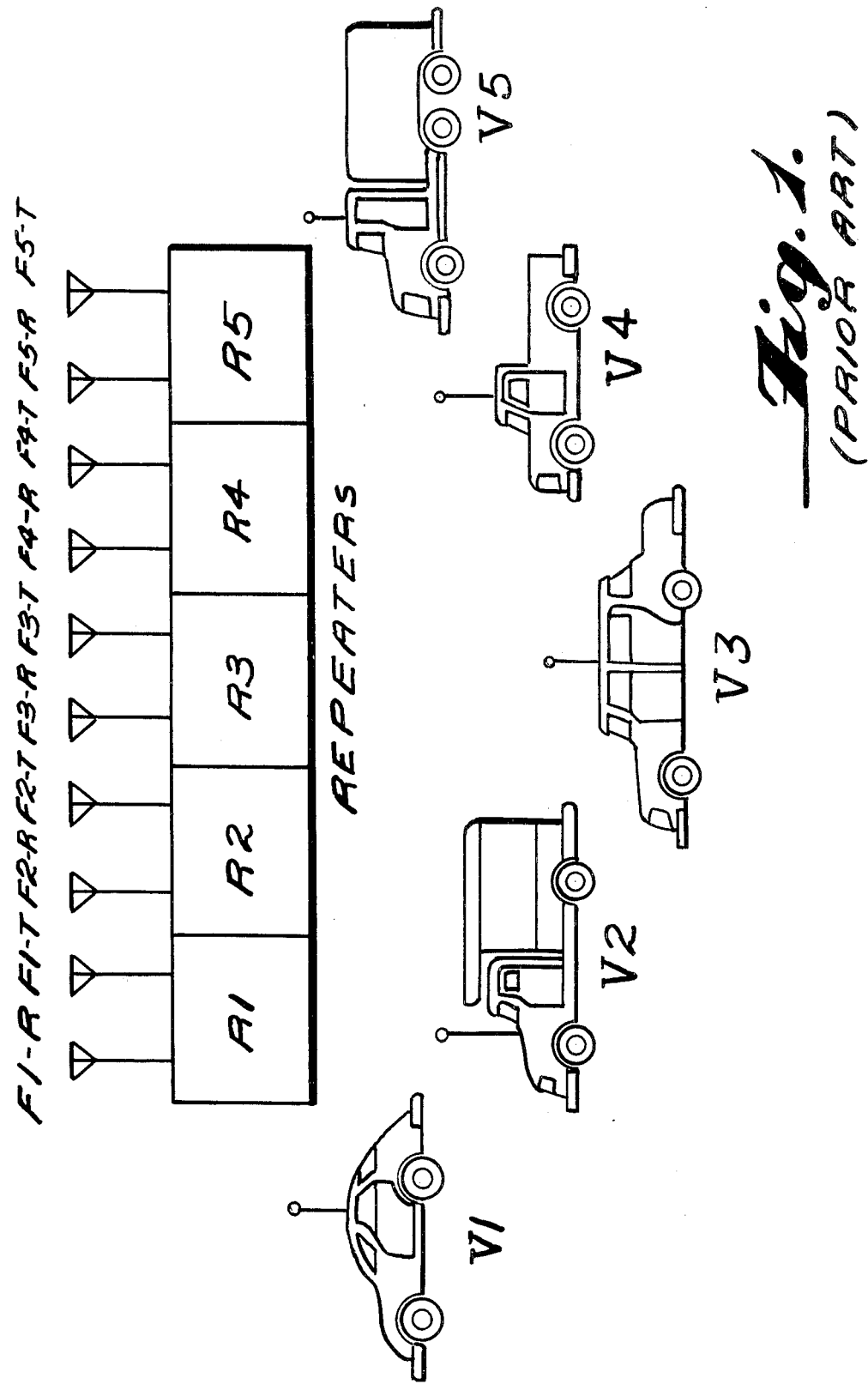
FIG. 1 is a pictorial diagram of a typical land based repeater trunking system.

Referring now to the figures wherein like reference numerals designate like or corresponding pars throughout, and specifically referring to FIG. 1, there is shown a pictorial diagram of a typical mobile communication repeater trunking system. The system illustrated includes five (5) repeaters R1–R5, each operating on a different communication channel. Each channel has a different transmitting and receiving frequency. For five channels, five repeaters R1 through R5 are provided and located at an available site that provides optimum coverage for the geographic region. Each of repeaters R1 through R5 includes a transmitter, a receiver, a transmitting antenna, and a receiving antenna.

For simplex operation, in the first repeater, R1, the receiver and receiving antenna function on a frequency F1-R, and the transmitter and transmitting antenna function on a frequency F1-T which is removed from frequency F1-R by a sufficient amount to provide good frequency separation for the transmitter and receiver. Other frequencies F2-R and F2-T through F5-R and F5-T are provided for repeaters R2 through R5 respectively.

In the same locality, different groups of users may utilize the repeaters with the radio transmitters and receivers in their mobile vehicles V1 through V5, for example. Typically, each group has a common basis, such as the vehicles in a given business, for example taxi cabs or a fleet of oil delivery trucks. The number of groups which a repeater can serve depends, among other things, upon the number of vehicles in a group, the amount of time a radio channel is used, and the number of repeater channels available. For example, five repeaters may serve as many as two thousand vehicles. A repeater trunking system provides a reliable arrangement for establishing communication between group members.

Figure 2:
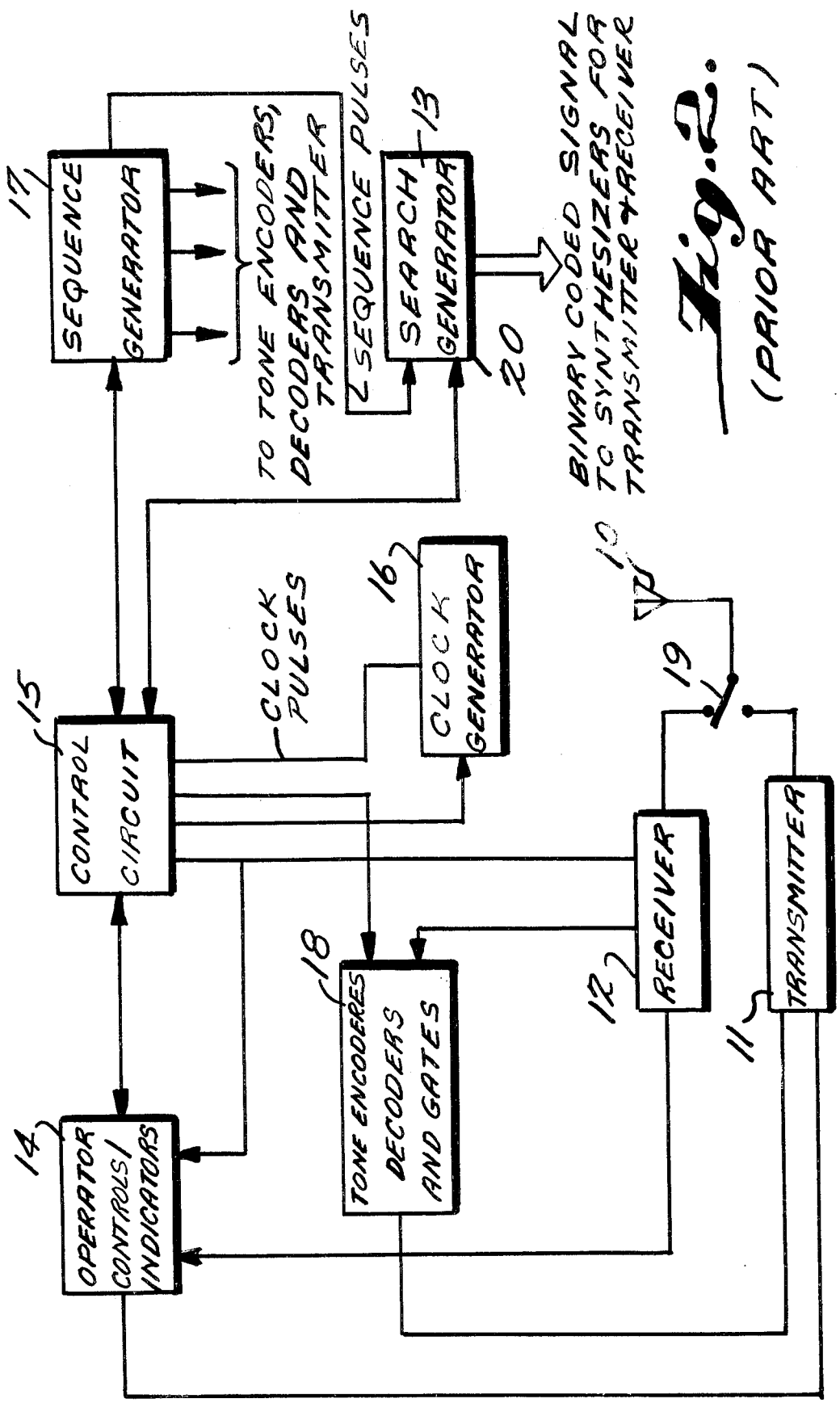
FIG. 2 is a general block diagram of the repeater trunking system as implemented in a mobile radio station.

Referring now to FIG. 2, there is shown a block diagram of such a repeater trunking system incorporated into each mobile station such as those installed in vehicles V1-V5, shown in FIG. 1.

Each mobile radio station in a vehicle includes a radio transmitter 11 capable of operating on any of the frequencies F1-R through F5-R, and a radio receiver 12 capable of operating on any of the frequencies F1-T through F5-T. Two frequencies are needed for each channel in order that the mobile station and the repeater can function in a simplex or push-to-talk arrangement. Thus, a mobile station would transmit on a repeater receive frequency (for example F1-R). The signal on frequency F1-R would be received by the repeater and transmitted to the other vehicles on frequency F1-T.

The other vehicles in the group would receive the signal on repeater frequency F1-T. When transmitting, the other vehicles would transmit on frequency F1-R. In such an arrangement, a single antenna 10 is switched by a relay 19 between the vehicular or mobile transmitter 11 and receiver 12, depending upon whether the mobile station is transmitting or receiving.

Full duplex operation could be provided by using these same two frequencies, but with separate receive and transmit injection, a duplexer, and separate antennas. Or, full duplex operation could be provided by specifying four separate and distinct frequencies within each channel and for the repeater associated with that channel.

Transmitter 11 includes a synthesizer (not shown) which operates at one of five transmit frequencies depending upon a binary coded signal applied to it by a search generator 13. Receiver 12 is preferably of the superheterodyne type and includes a synthesized local oscillator which also operates at a frequency corresponding to one of five frequencies depending upon the binary coded signal supplied by search generator 13. Clock signals are provided by a clock generator 16. Search generator 13 is supplied with clock signals which cause it to sequentially produce the binary coded signal specifying a particular channel at an output 20 thereof. This binary coded signal is applied to the transmitter synthesizer and receiver synthesized oscillator to cause transmitter 11 to be sequentially operable on radio frequencies F1-R through F5-R, and receiver 12 to be sequentially operable on the radio frequencies F1-T through F5-T. Tone encoders, decoders, and gates 18 are provided for decoding or filtering tones received by receiver 12 and for encoding or producing tones to be gated and transmitted by transmitter 11.

Each mobile station includes operator controls and indicators 14 to enable the user to operate his station and to have indications of the status of his station. The user controls permit the operator to place his station in a call originate mode to establish communication with another vehicle in the same group, or to place his station in an idle mode so that he will receive communications from other mobile stations in the same group.

A control circuit 15 supplies clock signals from clock generator 16 to a sequence generator 17 when the operator controls place the station in the call originate mode or to search generator 13 when the operator controls place the station in the idle mode.

In the call originate mode, control circuit 15 supplies clock pulses to sequence generator 17 to cause the sequence generator to produce signals which provide the following sequence of functions: first, locating an idle channel; second, transmitting a busy signal, suitably an audio tone of a predetermined fequency to the repeater to acquire and enable or activate the repeater transmitter and receiver on the idle channel; third, stopping transmission and causing the receiver to listen for an acquisition signal from the repeater; fourth, transmitting a group signal, suitably an audio tone of a predetermined frequency different from the frequency of the busy signal to identify other mobile stations within a predetermined group; fifth, transmitting a subgroup signal, suitably an audio tone having a frequency different from both the busy signal and group signal, if the stations in a given group are further subdivided into subgroups; sixth, stopping transmitting and causing the mobile station's receiver to listen and ascertain whether the repeater is sending out a transmission with a busy signal on the selected channel; and seventh repeating the sequence on all available channels if the repeater transmitter was not enabled or activated in the second function or if an acquisition signal was not received. If the repeater transmitter was activated, then indications are provided to the operator that he has acquired and activated a repeater, and that his station and the repeater are in a ready mode for operation.

In the idle mode, control circuit 15 supplies clock pulses to search generator 13 to cause the search generator to produce signals for changing the frequency of the transmitter synthesizer and receiver synthesized local oscillator. This causes the receiver 12 to sequentially tune to each of the five frequencies on which repeaters can transmit and, at the same time, causes transmitter 11 to sequentially tune to each of the five companion or associated frequencies on which the repeaters can receive. If the group signal for that particular mobile station is not detected on a channel, search generator 13 causes the receiver and transmitter of that mobile station to tune to the next channel frequency. This sequence of events continues as long as receiver 12 is operable, and stops only when it receives a busy signal, its predetermined group signal, and its subgroup signal if utilized. If the group signal and subgroup signal (if used) are received, control circuit 15 provides an indication to the user that he is being called. The user can then pick up his handset or microphone and communicate with the calling station.

Even though a particular communication system may include only five (5) available channels and five (5) repeaters, the transmitter synthesizer of each mobile station is programmed for operation on a much larger number of channels. For example, a mobile station could be programmed to operate, in addition to the channels of repeaters R1-R5, on the five (5) channels used in a neighboring locality. Similarly, a transmitter synthesizer could be programmed to operate on the five (5) channels of the "home" locality and the five (5) channels of each of five (5) additional localities providing a total capability of operation on 30 channels.

When a mobile user wishes to originate a call, he places his station in a call originate mode. Each channel, in turn, is examined in sequence. First, a channel is examined to determine whether it is in use, as evidenced by the existence of a busy signal thereon. If a channel is determined to be idle by the absence of such a busy signal, a signal is transmitted by the mobile station in an attempt to acquire and enable or activate the repeater on that channel. Thirdly, the mobile station listens for an acquisition signal from the repeater. In the event than an acquisition signal has been received, that repeater becomes dedicated to the mobile user and the mobile user proceeds to transmit group and subgroup signals to identify another user with whom he wishes to communicate. In the event that the mobile station is not able to dedicate a repeater to its use by a successful exchange of signals therewith, it moves on to test the next channel. This procedure consumes a finite amount of time. If 30 channels including those of neighboring localities were scanned in an effort to locate an idle channel, it would take a mobile user considerable time to locate and acquire an idle channel for communication.

The arrangement for cellular operation, according to the present arrangement, eliminates the wasted time associated with the transmitting on channels unused in a particular locality. The arrangement allows a mobile station to be pre-programmed to operate on a plurality of channels including channels from many different localities and then to be selectively operated on only those channels within a particular cell. When a particular cell is selected, transmission is inhibited on the channels not associated with that cell even though the mobile station has the inherent capability of operating on those channels. If a mobile user finds himself in a different locality and his mobile station has been pre-programmed to operate on the channels in that locality, he can select the cell associated with those channels and thereby interface and communicate with the repeater trunking system in that neighboring locality.

Figure 3:
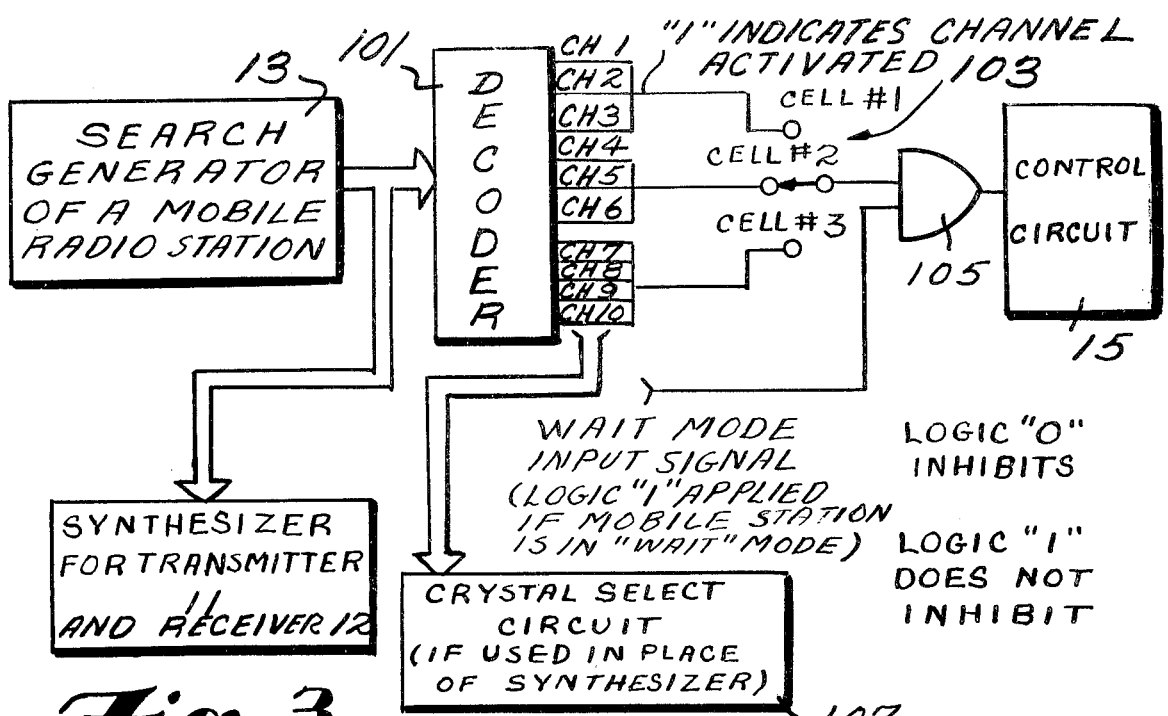
FIG. 3 is a block and schematic diagram of the arrangement for cellular operation of a repeater trunking system according to the present invention.

Referring to FIG. 3, there is shown a block and schematic diagram of the arrangement for cellular operation of a repeater trunking system according to the present invention. The binary coded signal at output 20 of search generator 13 provides the control for the synthesizer for transmitter 11. In addition, this binary coded signal is coupled to a decoder 101. Decoder 101 decodes the binary signal from search generator 13 and provides a logic level "1" output on one channel line corresponding to the channel called for by search generator 13, as determined by the binary code therefrom. For illustrative purposes only, the system shown in FIG. 3 is for a mobile station capable of operation on ten channels divided into three cells. Cell Number 1 includes channels 1-3, Cell Number 2 includes channels 4-6, and Cell Number 3 includes channels 7-10. The channel lines for channels 1-3 are all coupled to one throw of a cell select switch 103. Similarly, the channel lines for channels 4-6 are coupled to a second throw of switch 103 and channel lines for channels 7-10 are coupled to a third throw of switch 103. Switch 103 includes a pole selectively coupled to any of the three throws. The pole is coupled to one input of AND gate 104. The second input of AND gate 105 is supplied with a call originate, or "wait" mode input signal. The wait mode input signal is a logic level 1 if the mobile station is in the wait mode. The wait mode signal can be obtained directly from a point within the mobile station or can be generated by separate logic circuitry not shown. The output of AND gate 105 is coupled to control circuit 15.

The signal output from AND gate 105 coupled to control circuit 15 provides an inhibit signal for preventing the attempted exchange between a mobile station and a repeater operating on a channel in an unselected cell. By inhibiting this attempted exchange, significant time is saved. The search simply moves on to the next channel. Inhibit signals are provided by AND gate 105 for all channels belonging to an unselected cell.

The arrangement for cellular operation is equally applicable to mobile stations that are crystal controlled instead of being synthesizer controlled. In a mobile station equipped with crystals and a crystal select circuit 107, the output lines of the decoder 101 are coupled to the crystal select circuit. This eliminates the need for an additional decoder for crystal selection. The operation of the arrangement for cellular operation shown in FIG. 3 will be better understood by reference to FIG. 4.

Figure 4:
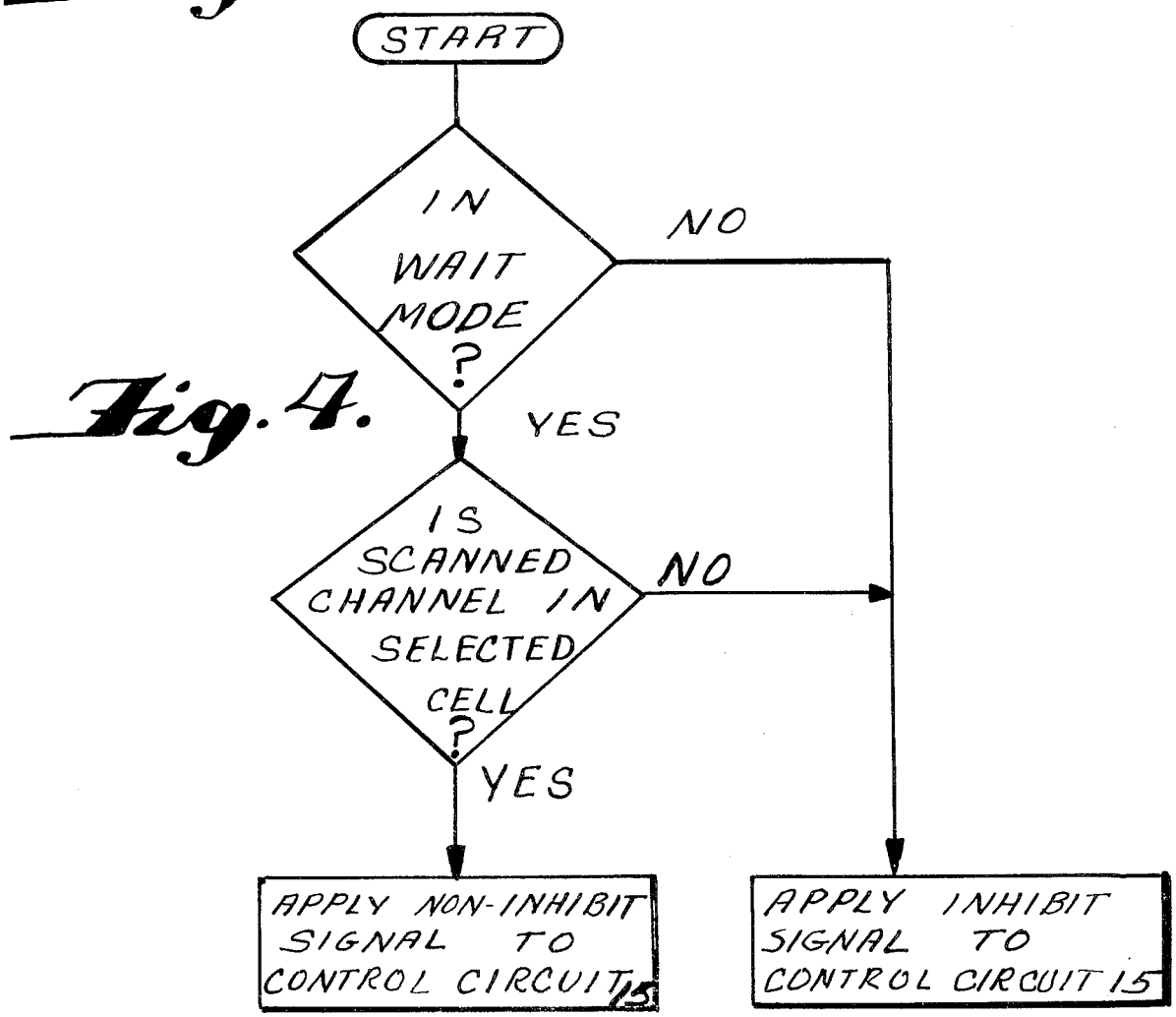
FIG. 4 is a flow chart indicating the operation of the arrangement for cellular operation of a repeater trunking system according to the present invention.

Referring now to FIG. 4, there is shown a flow chart of the operation of a mobile station equipped with the arrangement for cellular operation according to the present invention. When the mobile station is activated, a logic decision is made as to whether the station has been placed in the "wait" mode. If the mobile station is not in wait mode, the logic level "0" is applied to control circuit 15. However, if the mobile station is in the wait mode, then a logic decision is made as to whether the scanned channel is in a selected cell. If the scan channel is not in a selected cell in a logic level "0" is applied to control circuit 15. In the event that the scan channel is in a selected cell, a logic level "1" is applied to control circuit 15. A logic level "0" inhibits sequence generator 17 from attempting signal exchange with a repeater and a logic level "1" does not inhibit the attempted exchange.

Figure 5:
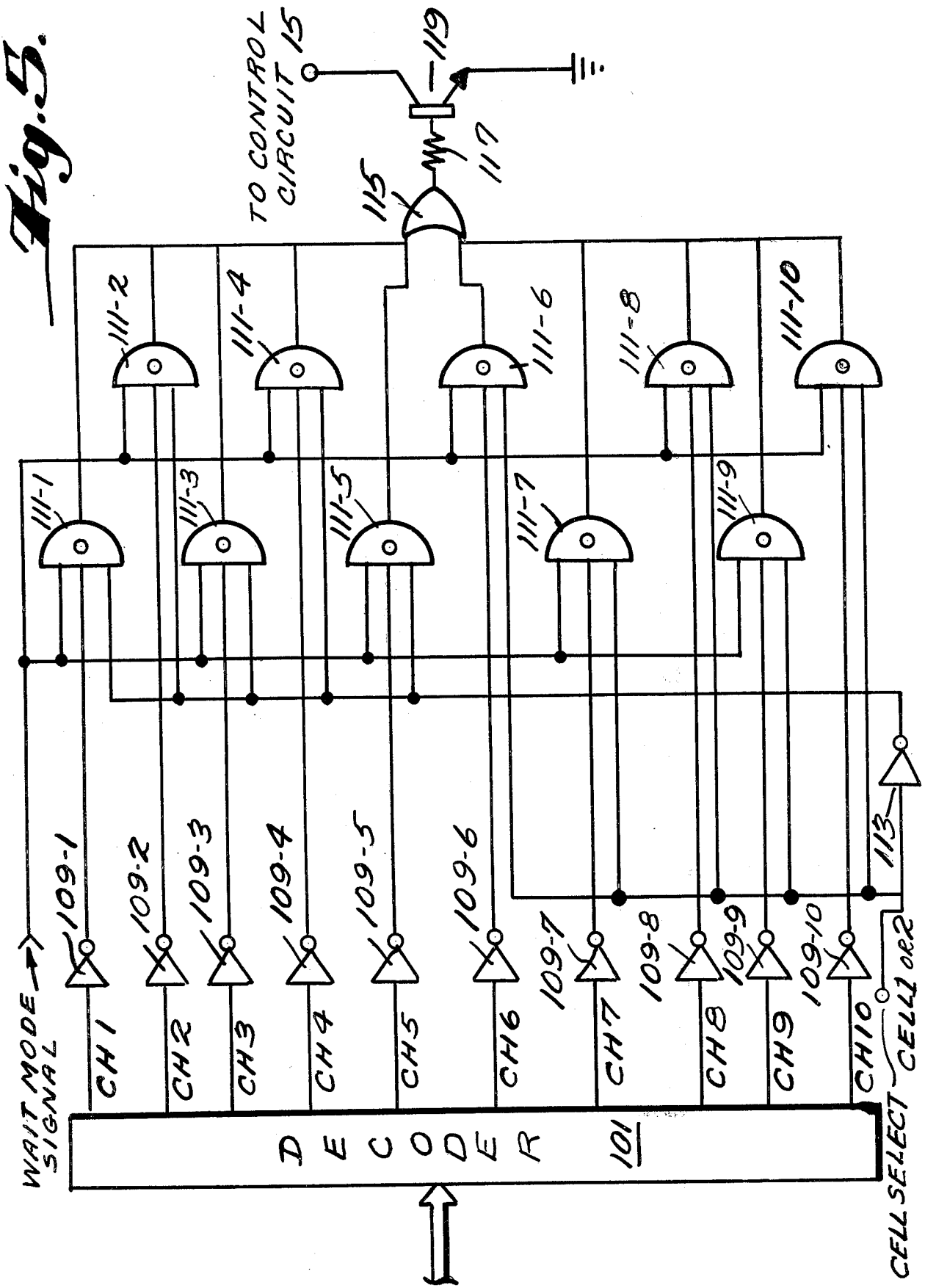
FIG. 5 is a schematic diagram of an alternate embodiment of the arrangement for cellular operation of a repeater trunking system according to the present invention.

Referring now to FIG. 5, there is shown a schematic diagram of an alternate embodiment of the arrangement for cellular operation according to the present invention. In this alternate embodiment, cell select switch 103 is replaced by a logic circuit. For illustrative purposes only, the FIG. 5 embodiment illustrates the implementation of two cells, the first cell including channels 1-5 and the second cell including channels 6-10. Of course, similar circuit arrangements could be provided for any combination of channels and cells desired. The output channel lines from decoder 101 are coupled respectively to inverters 109-1 . . . 109-10. The outputs of inverters 109-1 . . . 109-5 are coupled respectively to one input of each of gates 111-1 . . . 111-5. Similarly, the outputs of inverters 109-6 . . . 109-10 are coupled respectively to one input of each of gates 111-6 . . . 111-10. A second input of each of gates 111-1 . . . 111-10 are all coupled to a wait mode signal input. This wait mode input corresponds to the wait mode signal input shown in the embodiment shown in FIG. 3. A cell select input couples a cell select signal directly to a third input of gates 109-6 . . . 109-10. The cell select input is also coupled through an inverter 113 to a third input of gate 109-1 . . . 109-5. The outputs of all gates 111 are coupled to inputs of a further 115 providing an OR function. The output of gate 115 is coupled through a resistor 117 to the base of a transistor 119 providing a control signal for coupling to control circuit 15. In essence, the logic circuit shown in FIG. 5 performs a similar function than provided by cell select switch 103 shown in FIG. 3. The cell select signal applied to the cell select input of the FIG. 5 embodiment enables half of the gate while disabling the other half of the gate.

Figure 6:
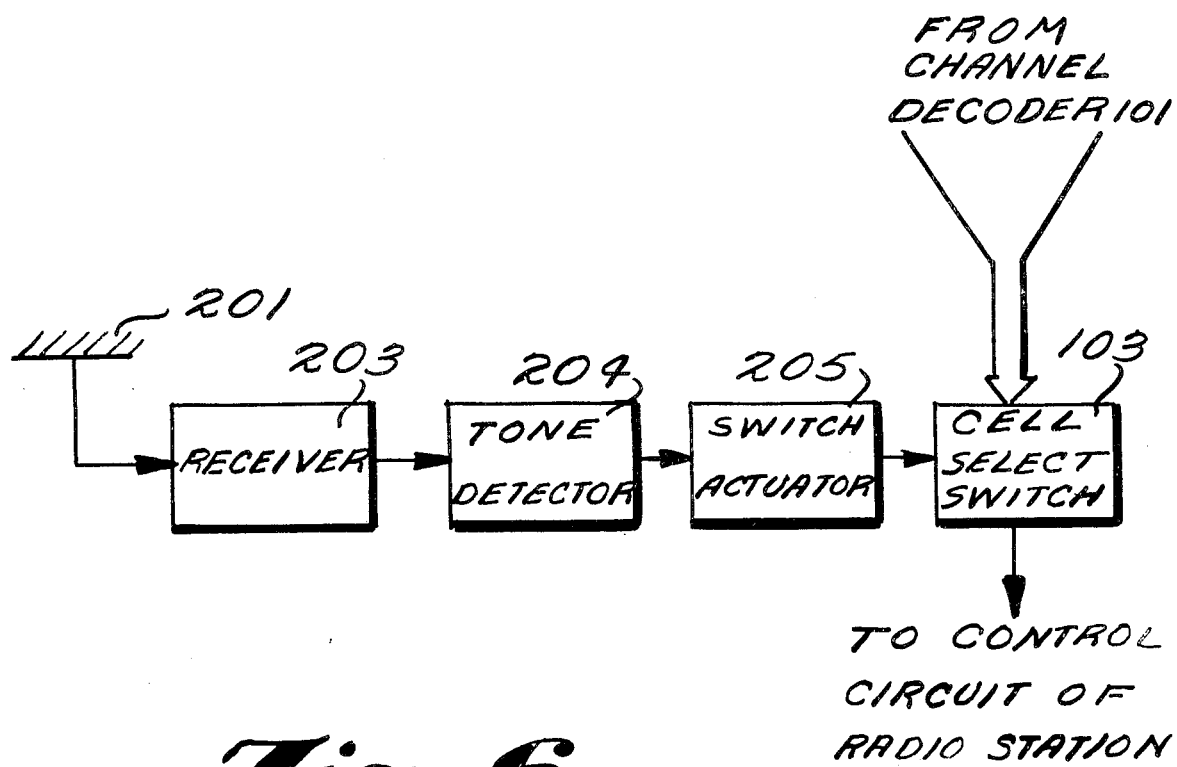
FIG. 6 is a block diagram for an arrangement wherein the cell select switch is actuated automatically in response to a received signal.

Referring now to FIG. 6, there is shown a block diagram for an arrangement wherein cell select switch 103 is actuated automatically in response to a received signal. A transmitter (not shown) associated with one or more repeater trunking systems could transmit a signal that is modulated so as to specify a particular cell. For example, each cell could be specified by an audio tone. A mobile radio station, operating in the vicinity of a particular repeater trunking system could receive this signal, demodulate it and be automatically cell selected. To implement such an automatic selection, the radio station would be equipped with an antenna 201 for receiving the transmitted signal. A receiver 203 would demodulate the signal and provide an audio output to a tone detector 204. Tone detector 204 would generate a signal responsive to the tone detected and activate a switch actuator 205. Switch actuator 205 would be coupled to cell select switch 103 so as to effect the actual selection of a cell.

Of course, such an arrangement could be implemented in a variety of ways. For example, the receiver could be responsive to a predetermined signal level so that when a mobile radio station moved close enough to a particular repeater trunking system it would automatically cell select that system. As another example, the signal could be centrally transmitted and operated by a third party to control the cell selection of a mobile radio station. As a further example complex digital coding or other forms of modulation could be used in place of simple tones.

A specific example of the cellular operation arrangement applied to a repeater trunking system is illustrated by reference to U.S. patent application Ser. No. 129,645, filed on Mar. 12, 1980, the content of said application being specifically incorporated herein by reference thereto. In the repeater trunking system illustrated in that application, the output signal from gate 105 in the FIG. 3 embodiment or from transistor 119 in a FIG. 5 embodiment is applied as a third input to gate G-4. The application of the control signal at this gate provides the desired inhibition of an attempted signal exchange between a mobile station and a repeater on a channel not in a selected cell.

There is therefore provided an arrangement for the cellular operation of a repeater trunking system providing enhance operating flexibility for a mobile station. When a mobile station is outside of its home territory and beyond the range of its local repeater, it is able to interface with and communicate with a repeater trunking system in its immediate locality by selecting the cell including the channels of that locality. There is no requirement that an additional data cahnnel be delegated with a complex computer-based control system for effecting the cell selection.

Of course, alternate embodiments and implementation schemes will be evident to those of ordinary skill in the art having the benefit of the teachings presented herein. For example, cell selection could be made automatically responsive to a signal received from a repeater trunking system. Therefore, it is contemplated that such alternatives are within the scope of the presently claimed invention.

What is claimed is:

1. In a repeater trunking system wherein a first plurality of radio stations communicate with one another via a first plurality of repeaters, each repeater operating on a different one of a first group of communication channels, said first group of channels constituting a first cell, and wherein a second plurality of radio stations communicate with one another via a second plurality of repeaters, each repeater operating on a different one of a second group of communication channels, said second group constituting a second cell and wherein a radio station originating a call scans potentially available communication channels to locate an unused channel and, upon locating an unused channel, initiates an attempted exchange of signals between the call originating radio station and the repeater operating on the located unused channel, a successful exchange of signals dedicating that repeater and unused channel to the use of the call originating station, an arrangement for the cellular operation of the call originating radio station comprising:
 means for generating signals on each of the communication channels of both the first and second groups of communication channels for scanning to find an unused channel within either said first or second group;
 means for initiating an attempted exchange of signals on each channel scanned to determine whether that particular communications channel is unused; and
 means coupled to said generating means for selecting operation in either said first or second cell, the selection of a cell selectively inhibiting the completion of such an attempted exchange of signals on any channel not within the selected cell, whereby said radio station, operating in a call originate mode, scans only the channels of the selected cell.

2. An arrangement according to claim 1 wherein said means for generating includes means for generating said signals in a predetermined sequence.

3. An arrangement according to claim 1 wherein said means for generating includes means for generating said signals in a random sequence.

4. An arrangement according to any of claims 1, 2 or 3 wherein said means for generating comprises a synthesizer.

5. An arrangement according to any of claims 1, 2 or 3 wherein said means for generating comprises a crystal controlled oscillator.

6. An arrangement according to any of claims 1, 2 or 3 means for generating comprises:
 a search generator for generating a signal indicative of a channel to be scanned; and
 a synthesizer coupled to said search generator for generating a signal on a channel designated by the signal from said search generator.

7. An arrangement according to claim 1 wherein said means for generating comprises:
 a search generator for generating a signal indicative of a channel to be scanned; and
 a synthesizer coupled to said search generator for generating a signal on a channel designated by the signal from said search generator; and
 wherein said means for inhibiting comprises:
  a decoder having inputs coupled to said search generator for receiving said signal indicative of a channel to be scanned, said decoder providing a signal on one of a plurality of output lines, each output line corresponding to a single channel, said output lines coupled together in cells to form cell lines, each cell line corresponding to a group of channels having at least one channel;
  a cell select switch means, coupled to said cell lines, for selecting one of said cell lines; said cell select switch providing an inhibit signal responsive to signals on unselected cell lines from said decoder, said inhibit signal for coupling to a control circuit of said radio station for inhibiting the scan of a channel.

8. An arrangement according to claim 7 wherein said cell select switch means comprises a switch coupled to a logic gate, said logic gate providing said inhibit signal.

9. An arrangement according to claim 7 wherein said cell select switch means comprises a logic circuit.

10. In a repeater trunking system wherein a first plurality of radio stations communicate with one another via a first plurality of repeaters, each repeater operating on a different one of a first group of communication channels, said first group of channels constituting a first cell and wherein a second plurality of radio stations communicate with one another via a second plurality of repeaters, each repeater operating on a different one of a second group of communication channels, said second group constituting a second cell and wherein a radio station originating a call scans potentially available communication channels in order to locate an unused channel and upon locating an unused channel initiates an attempted exchange of signals between the call originating radio station and the repeater operating on the located unused channel, a successful exchange of signals dedicating that repeater and unused channel to the use of the call originating station, a method for the cellular operation of the call originating radio station comprising the steps of:
 generating signals on each of the communication channels of both the first and the second groups of communication channels for scanning to find an unused channel within either the first or second group;
 initiating an attempted exchange of signals for each channel scanned for determining whether a particular communications channel is unused; and
 selecting operation in either said first or second cell, the selection of a cell selectively inhibiting the completion of an attempted exchange of signals on any channel not within the selected cell, whereby said radio station scans only the channels of said selected cell.

11. A method according to claim 10 wherein said step of generating signals includes generating signals in a predetermined sequence.

12. A method according to claim 10 wherein said step of generating signals includes generating signals in a random sequence.

13. A method according to claims 10, 11, or 12 wherein said step of generating comprises the step of generating signals with a synthesizer.

14. A method according to any of claims 10, 11, or 12 wherein said step of generating comprises the step of generating with a crystal controlled oscillator.

15. A method according to any of claims 10, 11, or 12 wherein said step of generating comprises the steps of providing with a search generator a coded signal indicative of a channel to be scanned; and
 generating a signal on a channel designated by the coded signal from said search generator.

16. A cell selecting arrangement for controlling the scan of a call originating radio station of the type including search means for generating scanning signals on each of a group of communication channels comprising:
 a decoder, coupled to said search means, having a plurality of output lines, one for each channel capable of being scanned by said call originating radio station, said decoder generating a signal on the output line corresponding to the channel on which scanning signals are being generated;

cell select switch means, coupled to said output lines for selecting among predetermined groups of said output lines, each such group corresponding to a cell constituting a sub-set of channels, said cell select switch means generating an inhibit signal at an output thereof whenever a scanning signal is generated in a non-selected cell, said output of said cell select switch means being adapted to be coupled to said station for inhibiting a transmission of scanning signals on channels in a non-selected cell.

17. A cell selecting arrangement according to claim 16 wherein said cell select switch means comprises:
  a switch coupled to the output lines of said decoder; and
  a logic circuit, coupled to said switch, for generating an inhibit signal responsive to a signal on an output line of a non-selected cell.

18. A cell selecting arrangement according to claim 17 wherein said logic circuit further includes means for determining when said radio station is operating in a call originating mode and generates inhibit signals only when said radio station is operating in a call originating mode.

19. A cell selecting arrangement according to claim 16 wherein said cell select switch means includes means for selecting among predetermined groups automatically in response to a received signal.

20. A cell selecting arrangement according to claim 19 wherein said means for automatically selecting comprises:
  means for receiving and demodulating said signal, and
  means, responsive to said receiving and demodulating means, for actuating said cell select switch means.

21. A cell selecting arrangement according to claim 19 wherein said means for automatically selecting comprises:
  a receiver for receiving and demodulating said signal;
  a tone detector for decoding cell select information carried by said signal; and
  a switch actuator responsive to said tone detector for actuating said cell select switch means.

22. An arrangement for enabling communicating between a call originating transceiver and a call receiving transceiver via one channel of either a first or a second plurality of communication channels, said first and second pluralities of communication channels constituting a first and second cell respectively, each of said transceivers being capable of scanning by the use of scanning signals all of said channels for a non-busy signal or an address signal, comprising:
  means, within the call originating transceiver, responsive to a received coded signal indicating a particular cells to be selected for generating a selection signal indicative of a desired one of first and second plurality of channels;
  means, within the call originating transceiver, for generating a transmit initiate signal;
  means, within the call originating transceiver, responsive to the transmit initiate signal, said selection signal and each of said scanning signals for providing a control signal; and
  means, within the call originating transceiver, responsive to said control signal for enabling communication between said call originating transceiver and call receiving transceiver via only one channel of the plurality of channels selected by the selection signal generating means.

23. A trunking transceiver comprising:
  a radio receiver capable of selective operation on any one channel of a plurality of channels;
  a radio transmitter capable of selective operation in a call originate mode of operation on any one channel of said plurality of channels;
  means for dividing the plurality of channels into groups, each group comprising one or more channels; and
  control means for selecting a particular group of channels and connected to inhibit said transmitter from normal operation in said call originate mode on any channel except those within a selected group of channels, the control means being operative to cause said receiver to scan all of the channels of all groups in search of any signals directed thereto unless the transceiver is placed in the call originate mode of operation.

24. A trunking transceiver as in claim 23 wherein said control means actually causes scanning of all said groups of channels during said call originate mode but also causes all channels to appear to be busy except for those within said selected group of channels.

25. A trunking transceiver as in claim 23 or 24 wherein said control means includes automatic group selection means for automatically selecting said selected group of channels.

26. Cell selection apparatus for use with a trunking transceiver including a radio receiver and transmitter, each capable of selective operation on any one of a group of N channels and control circuitry capable of causing said transmitter, in a call originate mode, to automatically search for an idle one of said N channels and to originate transceiver operations thereover, said apparatus comprising:
  channel identification means having input connections for repeatedly receiving control signals corresponding to each of said N channels; and
  cell definition means for defining a first sub-group M of said N channels and a second sub-group N-M of said N channels connected to said channel identification means for selectively providing a first output control signal representing a simulated busy channel status for said first sub-group M of said N channels and a second output control signal for use in permitting normal call originate mode transceiver operations to go forward for the remaining sub-group N-M of said N channels.

* * * * *

UNITED STATES PATENT OFFICE
CERTIFICATE OF CORRECTION

Patent No. 4,347,625          Dated August 31, 1982

Inventor(s) James W. Williams

It is certified that error appears in the above-identified patent and that said Letters Patent are hereby corrected as shown below:

Column 5, line 11, cancel "fequency" and insert -- frequency --
Column 8, line 52, cancel "cahnnel" and insert -- channel --
Column 11, line 59, cancel "cells" and insert -- cell --

Signed and Sealed this

First Day of March 1983

[SEAL]

Attest:

GERALD J. MOSSINGHOFF

Attesting Officer    Commissioner of Patents and Trademarks